United States Patent
Haghighi

(10) Patent No.: US 7,570,651 B2
(45) Date of Patent: Aug. 4, 2009

(54) HIGH-PERFORMANCE RECONFIGURABLE INTERCONNECT FOR CONCURRENT OPERATION OF MULTIPLE SYSTEMS

(76) Inventor: Siamack Haghighi, 15 Cala D'Or, Laguna Niguel, CA (US) 92677

( * ) Notice: Subject to any disclaimer, the term of this patent is extended or adjusted under 35 U.S.C. 154(b) by 593 days.

(21) Appl. No.: 11/153,944

(22) Filed: Jun. 15, 2005

(65) Prior Publication Data

US 2005/0281275 A1 Dec. 22, 2005

Related U.S. Application Data

(60) Provisional application No. 60/580,056, filed on Jun. 16, 2004.

(51) Int. Cl.
*H04L 12/28* (2006.01)
(52) U.S. Cl. .................. 370/401; 370/252; 370/468
(58) Field of Classification Search .............. None
See application file for complete search history.

(56) References Cited

U.S. PATENT DOCUMENTS

| 5,136,701 | A | 8/1992 | Kawai et al. |
| 5,774,684 | A | 6/1998 | Haines et al. |
| 6,247,102 | B1 | 6/2001 | Chin et al. |
| 6,434,688 | B1 | 8/2002 | Rhoden et al. |
| 2004/0017807 | A1 | 1/2004 | Dorr et al. |
| 2004/0017820 | A1 | 1/2004 | Garinger et al. |
| 2004/0215703 | A1 | 10/2004 | Song et al. |
| 2004/0225781 | A1 | 11/2004 | Kotlowski et al. |
| 2005/0026260 | A1* | 2/2005 | Resnick et al. ............ 435/158 |
| 2006/0064615 | A1* | 3/2006 | Dervisoglu et al. ......... 714/726 |

\* cited by examiner

*Primary Examiner*—Duc C Ho
(74) *Attorney, Agent, or Firm*—O'Melveny & Myers LLP

(57) ABSTRACT

The present invention generally comprises an on-chip interconnection apparatus. The apparatus, in one embodiment, includes programmable routing elements and communication segments coupled between the routing elements and multiple system units. In one embodiment, a first traffic stream is transferred between two of the system units through at least one of the programmable routing elements and at least one of the segments. At the same time, a second traffic stream is transferred between two of the system units through at least one of the programmable routing elements and at least one of the segments. In a preferred embodiment, the first traffic stream and the second traffic stream comprise distinct traffic classes.

31 Claims, 4 Drawing Sheets

HIGH-PERFORMANCE RECONFIGURABLE INTERCONNECT FOR CONCURRENT OPERATION OF MULTIPLE SYSTEMS

CLAIM OF PRIORITY

This application claims priority pursuant to 35 U.S.C. §119 (e) to U.S. Provisional Patent Application Ser. No. 60/580, 056, entitled "High-Performance Reconfigurable Interconnect for Concurrent Operation of Multiple Systems," which was filed with the U.S. Patent and Trademark Office on Jun. 16, 2004.

BACKGROUND OF THE INVENTION

1. Field of the Invention

The present invention generally relates to high-performance interconnection of multiple communicating processing systems. More specifically, the present invention is suitable for Very Large Scale Integration (VLSI) Integrated Circuit (IC) implementation.

2. Description of the Related Art

High-quality, networked multimedia consumer electronics devices require concurrent operation of multiple processing systems. Examples devices are high-resolution networked video Digital Versatile Disk (DVD) recorder, player, set top box and satellite receivers. The functional capability, performance, cost and power consumption of a multimedia consumer electronics device is greatly affected by the choice of the interconnection mechanism. Power and cost efficient implementations require special considerations for application and algorithmic requirements, such as access latency, bandwidth, and number of concurrent traffic streams. With the increasing complexity of the VLSI ICs, efficient operation as measured by increased utilization of internal resources, support for multiple functions, and power consumption efficiency become increasingly more important yet complex.

In many current design practices, various processing units are joined together using one or several shared interconnect bus. Example on-chip shared bus mechanisms are Advanced High-performance Bus (AHB), Peripheral Component Interface (PCI) or other similar proprietary mechanisms. Parallel shared interconnect bus mechanisms are attractive due to design, validation, manufacturing, testing simplicity, and high transfer rate but suboptimal due to power consumption, scalability to large number of units, timing skews, and operational speed. Multiple shared hierarchical parallel interconnects such as multi-layer AHB or PCI, are an attractive alternative due to potential for localization and organization of data traffic but incur additional cost, power consumption, validation, and design complexity. Recently, Network-on-Chip (NOC) interconnects have been proposed and demonstrated by some researchers as an alternative suitable for VLSI IC implementation. While NOC address many deficiencies of the shared parallel interconnect bus (e.g. scalability to large number of devices, timing skew and operational speed), they do not provide fine grain optimization mechanisms for application and algorithm specific communication traffic. Switching fabric interconnect technologies are viable alternatives; however most are proprietary and not well suited for interconnection of on-chip system units.

Efficient concurrent system operation requires simultaneous support of many communicating traffic sources and destinations. For example, in a digital video decode system, there are several operational modes such as motion compensation, inverse transform, inverse quantization and video post processing. Each mode has unique processing resource requirements depending on factors such as algorithmic complexity, available processing resource capability, communication resources and real-time deadlines. Each operational mode is characterized by data and control information traffic transfer between one or several source and destination units. The performance and power consumption efficiency of the overall system can be significantly improved by ensuring the interconnection is optimized for each or arbitrary plurality of modes.

Currently, none of the reported, VLSI implementation suitable, interconnect mechanisms provide facilities for fine grain interconnect configuration and optimization based on system application modes or algorithms. It can thus be appreciated that a need exists for novel, cost, and power efficient, VLSI implementation suitable, and dynamically reconfigurable interconnection mechanism that can be optimized to meet fine-grained application and algorithmic requirements.

SUMMARY OF THE INVENTION

One aspect of the present invention is to provide a fabric apparatus capable of bi-directional communication. In one embodiment, one or several point to point communication fabric segments can be implemented as serial or parallel bus and is in general capable of bi-directional communication.

Another aspect of the present invention provides improved overall system efficiency. In one embodiment, the efficiency is achieved through fine grain static or dynamic communication traffic optimization and control between concurrent system sources, destinations, reconfigurable interconnect fabric resources and facilitation by one or more control and configuration programs. An example embodiment system that utilizes the invented mechanism is described in detail.

Still another aspect of the present invention is to provide multiple VLSI or large system units suitable for VLSI implementation. In one embodiment, the invention includes routing elements that can select and transfer traffic streams from one or more sources to one or more destinations facilitated by a control program, mechanisms that translate a stored or designed control program to a suitable format for controlling, configuring a routing element, loading and storing of one or several control programs, and interface circuitries that perform traffic format conversion between various system units and reconfigurable interconnect fabric inputs and outputs.

DETAILED DESCRIPTION OF THE INVENTION

Figure 1:
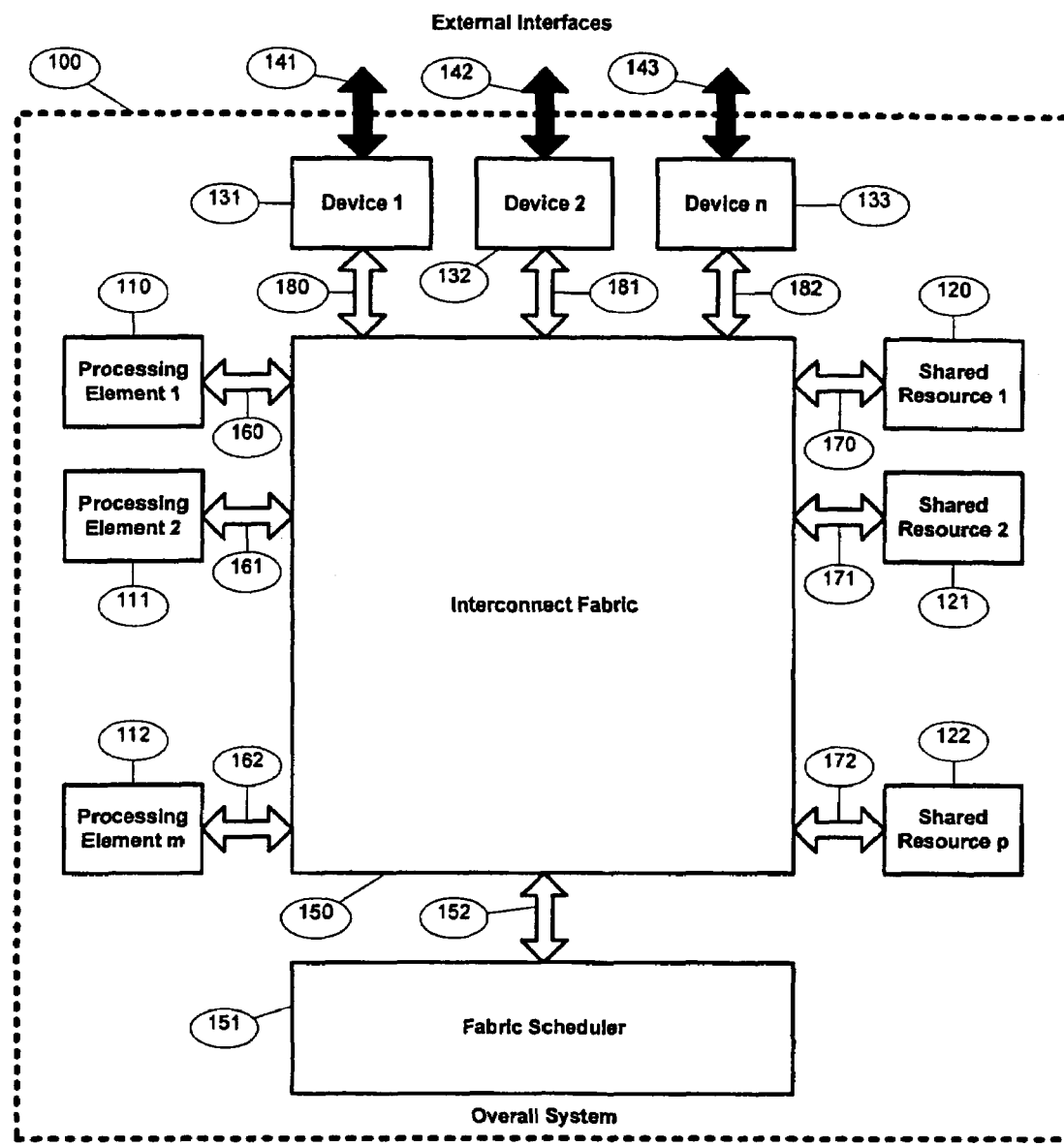
FIG. 1 is a general system diagram of an embodiment of the present invention.

FIG. 1 illustrates an embodiment of system 100. In this embodiment, the system 100 includes n Input-Output (I/O) device interface units 131-133 that provide connection between system 100 and external devices or peripherals through interfaces 141-143. By way of example only, these devices may include semiconductor storage Dynamic Random Access Memory (DRAM), Ethernet, wireless standard compliant networking, digital image sensor, hard disk storage, expansion interface for creating larger systems using multiple systems of the type 100, and flash memory controller. The interfaces 141-143 may be digital or analog based on design considerations and the external device capabilities.

The system 100 also includes m processing elements 110-112 that provide necessary computing facilities for system 100. By way of example only, processing elements may include special purpose hardware accelerators such as coprocessors for motion estimation, Fast Fourier Transform (FFT), encryption and decryption security processors or programmable Central Processing Units (CPU). Interfaces 160-162, 170-172, 180-182 contain appropriate traffic format conversion circuitry between system units 110-112, 120-122, 131-133 and the interconnect fabric 150 input and output.

The system 100 further includes p internal resources 120-122 with shared usage among various system 100 internal units. By way of example only, these internal resources may comprise on-chip memory and Direct Memory Access (DMA) controller. In a preferred embodiment, the system 100 includes one or more reconfigurable interconnect fabric units 150 used for movement of communication traffic among system units. The communication between the interconnect fabric 150 and system units is facilitated through interface conversion circuitry 152, 160-162, 170-172, and 180-182.

The system 100 may also include an interconnect fabric scheduler unit 151 that configures and services communication traffic between I/O devices, processing elements, shared resources and the available fabric segments. This unit will control and configure accesses through fabric, optimize the overall system for metrics such as performance and access latency using trade-off parameters such as power consumption, overall system efficiency, VLSI cost and a fabric schedule program. In an alternative preferred embodiment, the fabric scheduling unit may be implemented as a distributed mechanism, inherently part of the interconnect fabric unit 150 internal elements such as routing units, integrated hardware with processing elements 110-112, shared resources 120-122, I/O devices 131-133, software program executed by processing elements 110-112 or communication through I/O devices 131-133.

Figure 2:
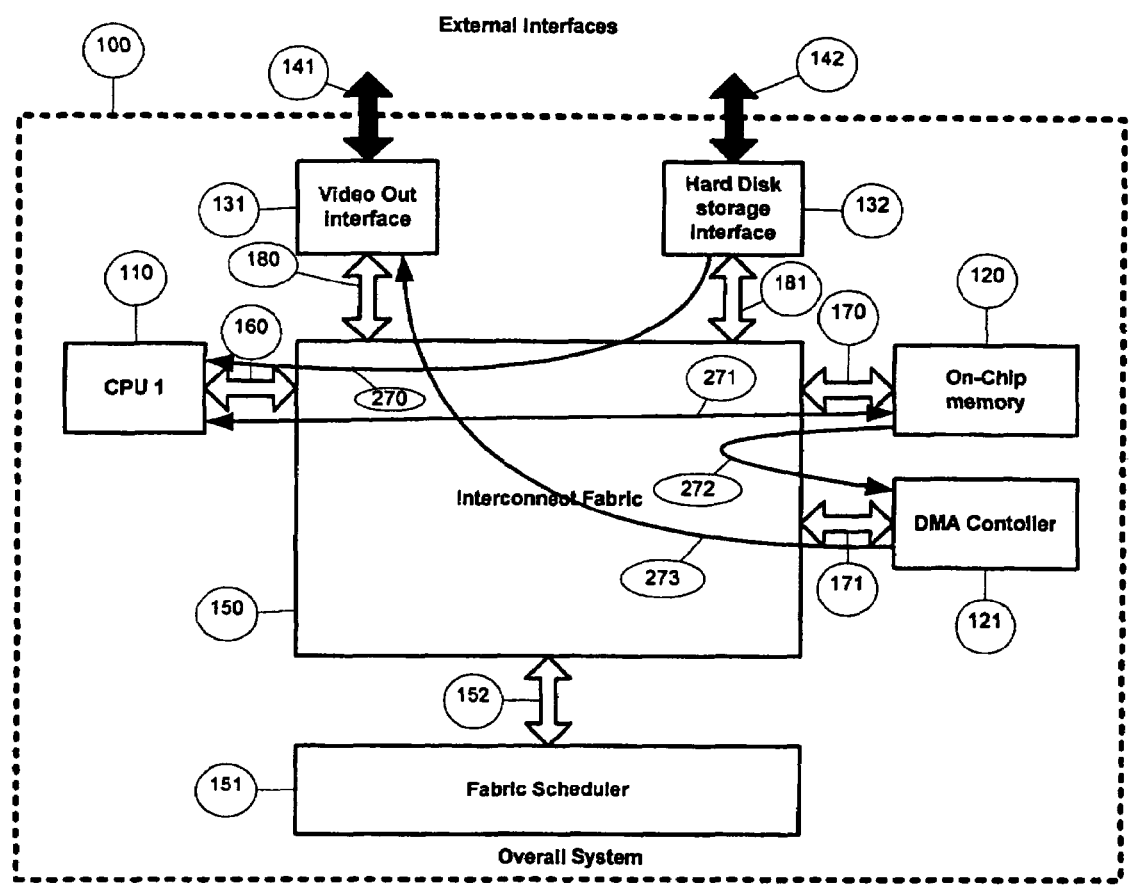
FIG. 2 is a schematic diagram of an example of concurrent traffic streams in a system as illustrated in FIG. 1.

FIG. 2 depicts one embodiment of major concurrent system traffic streams. For example, in one embodiment, during video decode and display application operation, the major system traffic streams are approximated as 270-273. The application consists of several modes; hard disk compressed bit stream data access, video decode entropy decode, motion compensation, inverse transform, inverse quantization and display post-processing. Traffic classification is determined at the input and output of the fabric (sometimes referred to as ingress, egress) and suitable for usage by appropriate fabric schedule. The routing units select, facilitate transfer or potentially buffer the classified traffic based on a fabric schedule.

In this embodiment, one major traffic stream includes stream 271. Stream 271 illustrates CPU 110 accessing reconstructed video data to on chip memory unit 120. In write operation mode traffic, the source of the traffic stream is the CPU 110 and destination is unit 120. In a read return operation mode traffic, the traffic source is unit 120 and the destination is CPU 110. Another traffic stream comprises stream 270. Stream 270 illustrates CPU 110 retrieval stream of compressed video using hard disk interface 132. The source of this traffic stream is the hard disk storage interface unit 132 and destination is CPU 110. Yet more streams includes streams 272, 273. Each of these streams illustrate DMA controller operation of reading reconstructed video data (272) and subsequent write (273) to video out interface unit 131 for display on an externally attached unit.

Figure 3:
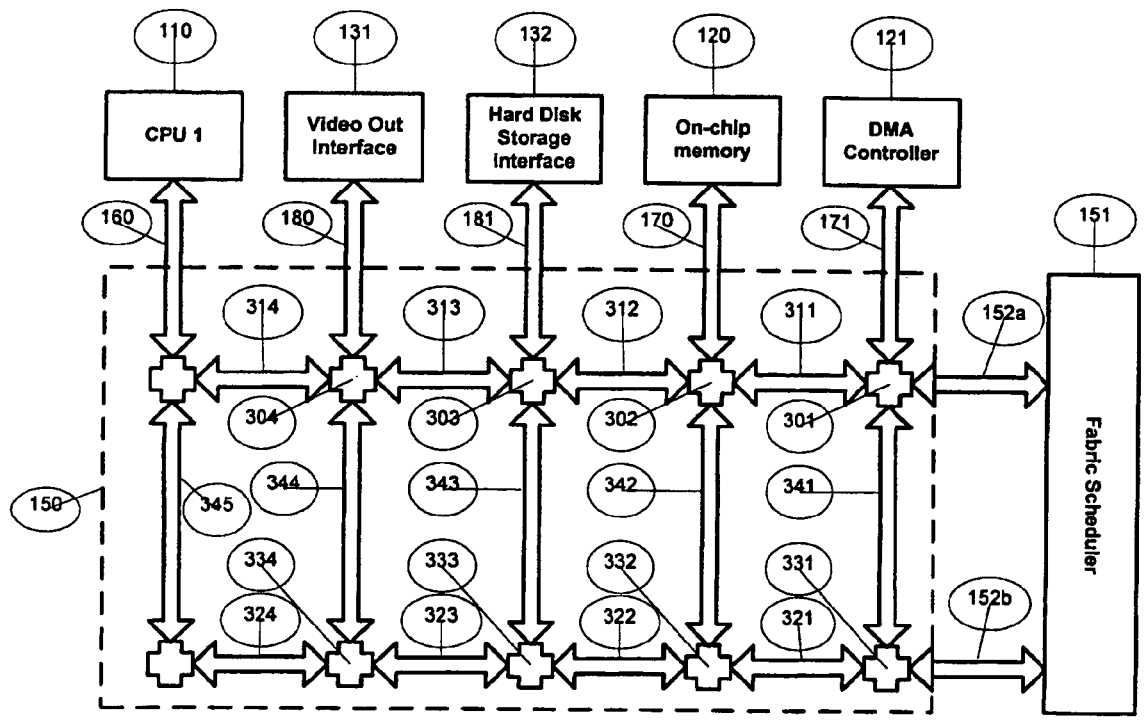
FIG. 3 is a schematic diagram of one embodiment of the apparatus and mechanism for a reconfigurable interconnect fabric.

FIG. 2 streams 270-273 are representative of major structured data traffic created or used during video decode and can be categorized during system analysis and design using a variety of techniques. FIG. 3 depicts an example preferred embodiment of a reconfigurable interconnect fabric and a fabric scheduler. Fabric scheduler unit 151 provides control, configuration, and optionally status collection capabilities to and from internal fabric units. There are one or several fabric segments each consisting of point to point interconnects such as 311-314, 321-324, and 341-344. Each point to point fabric segment is connected via routing elements 301-304 and 331-334. Each routing element can direct traffic stream to or from various processing, peripheral or shared resource units such as 110, 131-132, and 120-121. The quantity, topology and parameters of the fabric segments, routing elements are determined at the design time using variety of analysis and simulation techniques.

It can be appreciated that the invented mechanism can accommodate variety of interconnection of system elements from a single shared communication fabric segment (similar to a shared bus in current literature) to full crossbar (similar to connecting each unit to all other units). Various fabric topologies can be accommodated. For example in a VLSI implementation, various system units may be laid out as arrangement of rectangles of sub blocks. A viable interconnection fabric is a homogenous interconnect grid between the rectangular areas.

Determination of a fabric schedule program may be facilitated through such means as manual determination or automation via extension of existing software compilers or hardware synthesis tools. The global fabric topology does not have to be uniform. For example, there may be a fabric segment that has higher operational speed and potentially larger size than other fabric segments.

A traffic stream may consist of many smaller distinct transfers. Each transfer may be fixed or variable size. For example, a traffic stream may consist of several fixed size data packets. An example fabric schedule at a routing unit services a traffic packet from an incoming connection, looks up internal routing table and directs that traffic packet to appropriate output connection based on the routing table information. Alternatively, the routing element may opt to internally buffer the traffic packet for later transfer. As another alternative, the routing unit may accommodate concurrent transfer of multiple incoming traffic to multiple outgoing destinations. A fabric schedule may necessitate accommodation of traffic through tandem operation of multiple routing units and fabric segments for at least part of the overall communication traffic. For example, a traffic stream will use several internal routing units and fabric segments operating in tandem for higher performance operation but still have a single interface between communicating units.

Traffic streams are classified based on application operation mode and global characteristics such as bandwidth, latency, and burst behavior. A fabric schedule program is determined and subsequently used during normal system operation. A fabric schedule program determines configuration of various fabric units that meet concurrent communication traffic requirements of one or several application modes. Alternatively, each application operation mode may have its own schedule program. Configuration and operation of interconnect fabric elements can be statically or dynamically altered based on a fabric schedule program. A traffic class is organization of input and output data to each unit into distinct categories based on characteristics of interest such as bandwidth, latency, ordering for more efficient resource utilization, quality of service, etc.

Mechanisms to employ multiple traffic schedules, including loading and storage of the new schedule programs are provided. A routing element may provide internal storage, selection and forwarding of potentially multiple traffic streams from multiple inbound fabric segments to multiple outbound fabric segments. A traffic routing unit may accommodate multiple traffic types based on a predetermined fabric schedule program.

Based on design considerations, multiple system units may share a fabric interface unit. Communication between a traffic source and destination is accomplished through employment of one or more fabric segments and routing elements. Each traffic stream may employ all or subset of the capabilities of the plurality of the fabric segments. As determined by a fabric schedule program, any fabric segment may be used to carry traffic for multiple communicating units at variety of transfer granularity sizes, service schedules and durations. In such case the fabric lanes and the fabric scheduler will contain necessary mechanism to support the additional capability. Multiple fabric segments may be selected to operate in tandem to provide required services for incoming or outgoing traffic.

For some traffic streams, it may be desirable to subdivide it into several streams. One example is Read information traffic stream. This stream can be divided to request and read return streams. This enhancement may facilitate potentially more efficient system operation and each stream subdivision can be accommodated by a different schedule program. Alternatively, it may be beneficial to aggregate several streams into one stream.

Depending on system, internal unit organization and application modes, there are a variety of possible traffic classification and service policies. For example, outgoing traffic from a source system unit may be classified to multiple categories based on required bandwidth, latency tolerance and real-time deadline requirements. Similarly, the traffic carrying capabilities of the interconnect fabric can be classified and organized, e.g. multiple bandwidth reservation and latency guaranteed channels. A fabric schedule program accommodates assignment and service of one or several application class traffic via one or several appropriate fabric traffic channels. This capability is provided for both incoming and outgoing fabric traffic. This facilitation provides potential improvement in the overall system operation and utilization efficiency. This invention claims the plurality of fabric schedule programs that facilitate admission, service and acceptance of various system units via appropriate fabric communication channel capabilities.

Based on power consumption considerations, there may be circumstances that the full traffic carrying capability of system interconnect fabric may not be needed. In such cases, the fabric elements (fabric segment, routing elements, and fabric program) provide facilities for reduced functionality and lower power consumption configurations. For example, a fabric program may shut down all fabric segments and routing elements not used during an application mode traffic stream. Other variations include dynamic voltage and/or frequency scaling of the interconnection fabric elements to facilitate lowering power consumption or higher performance, each fabric segment and routing element working at different electrical signaling, voltage and speed. This invention claims mechanism and apparatus extensions that include such capabilities.

For detailed operation of the invented configurable interconnect fabric, consider categorization of FIG. 2 traffic streams as:

Class 1: High bandwidth, high latency tolerant traffic stream. Fabric segments 160, 170, 312-314, 311-314, 321-324, 341-345 may be used. Stream 271 is an example of this type.

Class 2: Mid bandwidth, high latency tolerant traffic streams. The fabric segments may be aggregated into multiple groups. For example, stream 272 may use segments 170, 171, 311 while stream 273 uses 171, 180, 341, 344, 321-323.

Class 3: Low bandwidth, low latency tolerant streams. Fabric segments 160, 181, 313-314 are used to form a communication path between stream source and destination units. Stream 270 is an example of this type.

The aggregate capabilities of the reconfigurable interconnect fabric are fixed and depend on design parameters such as number of fabric segments, throughput and width of each fabric segment, possible routing path alternatives, cost, power, and area. A fabric schedule program is one that globally optimizes, allocates and accommodates concurrent traffic based on available fabric resources. Such program will be determined using variety of analytical and simulation techniques at the design time. A fabric schedule contains configuration parameters for operation of the interconnection fabric routing units and include items such as traffic routing tables, relative priority for service of concurrent streams, number, duration, temporal or other admission based service policies. The fabric scheduler unit 151 may store one or several programs. During system operation, one or several fabric schedule programs are available for dynamic optimization of variable application traffic. Fabric schedule programs may be statically or dynamically changed during the system operation. There are a variety of mechanisms to alter fabric program. For example, CPU 110 may execute a software program to alter fabric schedule through series of configuration traffic stream transfers through the interconnect fabric or direct interface to fabric scheduler unit 151 via non-fabric connections.

The reconfigurable interconnect fabric illustrated in FIG. 3 provides many benefits. For example, low implementation complexity and cost: The fabric can be configured and optimized to accommodate multiple concurrent traffic streams. The optimization may result in significant reduction in storage elements required for intermediate traffic information buffering. This facility results in lower overall system cost and is especially important for the design of high performance image and digital signal processing VLSI and systems.

In addition, another benefit is increased system efficiency. Through optimization of the fabric schedule program, the system functions can be performed more efficiently due to increased concurrency, resource utilization and reduced latency. Increased power consumption efficiency is another benefit of this system. Through use of multiple optimized fabric scheduling programs, the operation of multiple system units during various applications and algorithms can be tuned for increased power consumption efficiency. Further, the system is more versatile. Since the fabric schedule is adjustable, designers of complex VLSI may determine pathological performance critical communication traffic that may not have been expected during initial design consideration. So long as the gross available interconnect fabric facilities are met, the fabric can be reconfigured to address the pathological case demands.

System of multiple elements comprising of general or specialized purpose processing, shared resources, external device interface, and interconnection using configurable fabric that provides communication among the units and controlled via a centralized or distributed fabric schedule. Each system unit may contain other internal units appropriately organized. The fabric interconnect includes appropriate interface capability to accommodate traffic format conversion to and from various system units and internal fabric operation. Example facilities include traffic classification, prioritization, control, buffering, and flow-control circuitry.

The interconnect fabric consists of one or several fabric segments each capable of uni or bi-directional communication information transfer, routing elements and interfaces for communication to and from the fabric. The interconnect fabric transfers concurrent traffic streams among several sources and destinations. Many interconnect fabric topologies with different organization, number of fabric segments, routing units, inbound and outbound fabric segments to a routing unit, fabric segment speed, and bit-width are possible.

Figure 4:
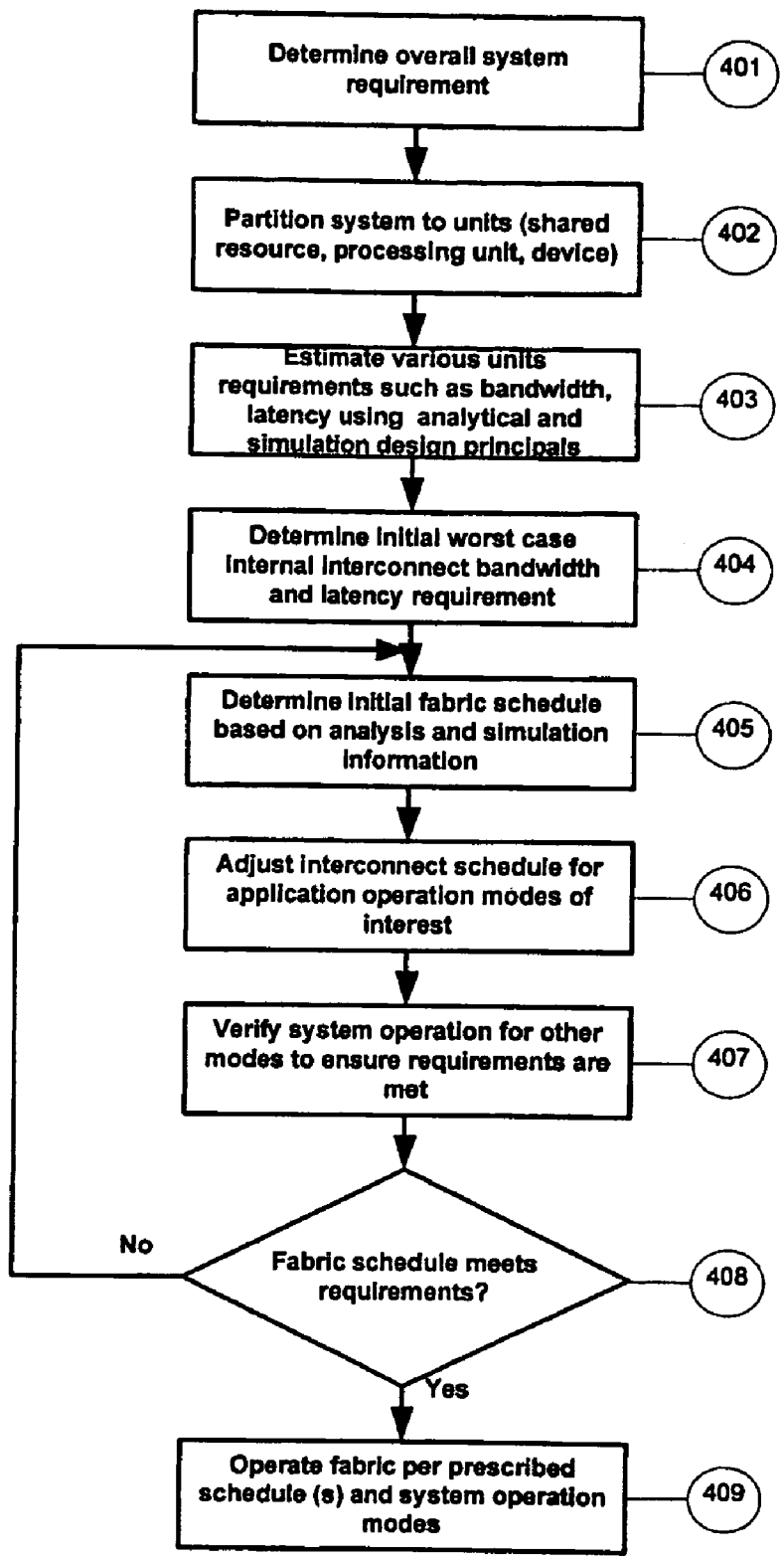
FIG. 4 is flow diagram illustrating the steps performed by an embodiment of the present invention to determine a control and configuration program that preferably configures and operates the reconfigurable interconnect fabric.

FIG. 4 illustrates on embodiment of the steps executed by an example mechanism for determination of a fabric schedule control program. For example, in step 401, overall system requirements and parameters are determined. This step involves architecture exploration, requirement analysis and simulation. Example items include average and peak bandwidth, access pattern, burst vs. random access, power consumption per fabric segment unit length operation, VLSI implementation size and cost.

The interconnect fabric parameters such as size, number of the fabric segments, speed and voltages are, in one embodiment, predetermined at the design time based on global considerations such as design, validation complexity, bandwidth, transfer size, latency, switching speed, semiconductor process technology, circuit design and power consumption. The fabric segment physical signaling mechanisms are also preferably pre-determined at the design time based on similar design considerations. The interconnect topology of the routing elements can be determined based on global design considerations. The routing elements may optionally include internal storage elements such as registers or memory elements to allow more efficient traffic communication.

One or more control programs are determined at the design time based on global considerations, and used for operation, configuration of routing units, fabric segments, and routing of traffic to and from various system elements. Appropriate mechanisms to load and store new control programs are also included. The control program may be implemented as software bit pattern suitable for storage in a semiconductor memory, programmable processing unit, reconfigurable logic or other similar implementation mechanisms. Alternatively, a distributed implementation where a fabric schedule is built into system units or executed as a software program via a CPU are also possible. The interface units provide conversion, buffering, flow control and classification of communication traffic to and from the interconnect fabric and various system processing units.

In step 402, external and internal VLSI system units organization is determined including partitioning to general or special processing units (e.g. similar to FIG. 1). This step involves exploration and initial determination of the overall system organization while meeting system budgets such as die area, power consumption and performance of the available alternatives.

In step 403, application analysis and operational modes are explored to estimate communication traffic to and from various units. The estimate determines required parameters such as bandwidth and latency of various traffic sources and destinations for selected system operation modes.

In step 404, the most stringent concurrent traffic stream requirement such as bandwidth and latency are used to establish the baseline interconnect fabric implementation, topology and parameters. In step 405, first pass estimate of the fabric schedule is determined from the detailed analysis steps and potentially simulation of key application operation modes. The schedule contains key fabric configuration and operation parameters such as routing information, fabric segments used to establish traffic communication, service priority, time assignment, duration, transfer size for each traffic type and routing unit.

In step 406, the scheduler is verified to operate according to planned fabric schedule program using variety of analytical, design, and simulation techniques. In step 407, a fabric schedule program is examined for fitness to meet additional application operation mode requirements not included during initial schedule determination. This step may be performed using variety of mechanisms such as real system or prototype testing, software simulation or hardware emulation of the system. The goal of this step is to determine the fitness of one or more fabric schedules as a candidate for global system operation. Example fitness measures are power consumption, bus utilization efficiency, and critical deadlines missed.

In step 408, determination is made whether one or several interconnect fabric schedule program meet overall system application requirements. If one or several programs are determined to be a good fit, no further adjustments to fabric schedule program are necessary. However, if further optimization is required or the determined traffic schedule does not adequately meet application operation mode requirements, further refinements may be made.

In step 409, during the normal system operation, one or several fabric schedule programs may be employed. Based on design considerations, variety of mechanisms to support, change, test and store multiple fabric schedule programs are also employed.

It should be appreciated that the above-described mechanisms and processes are for explanatory purposes only and that the invention is not limited thereby. Having thus described a preferred embodiment of a method and system, it should be apparent to those skilled in the art that certain advantages of the within system have been achieved. It should also be appreciated that various modifications, adaptations, and alternative embodiments thereof may be made within the scope and spirit of the present invention.

The invention claimed is:

1. An on-chip interconnection apparatus, comprising:
   a plurality of programmable routing elements;
   a plurality of communication segments coupled between said routing elements and a plurality of system units;
   wherein the plurality of programmable routing elements and the plurality of communication segments are adapted for integration into very large scale integrated (VLSI) circuit designs;
   wherein a first traffic stream is transferred between two of said plurality of said system units through at least one of said plurality of programmable routing elements and at least one of said plurality of segments;
   wherein a second traffic stream is transferred between two of said plurality of said system units through at least one of said plurality of programmable routing elements and at least one of said plurality of segments; and
   wherein said plurality of programmable routing elements implement a fabric schedule based on a global classification of said first traffic stream and said second traffic stream said fabric schedule being determined using optimization criterion based on two or more factors from a set consisting of bandwidth, quality of service, traffic priority class, cost, scalability for future enhancement, power consumption, physical size, development time, process technology, resource utilization and efficiency.

2. The apparatus of claim 1, wherein said system units comprise one or more processing elements and one or more I/O device interface units.

3. The apparatus of claim 2, wherein said system units further comprise one or more shared resources.

4. The apparatus of claim 2, wherein said processing elements comprise one or more from the set consisting of: central processing units, encryption and decryption security processor, Fast Fourier Transform hardware accelerator, motion estimation hardware accelerator, Viterbi encoder and decoder and other appropriate fixed function hardware accelerators.

5. The apparatus of claim 2, wherein said I/O device interface units comprise one or more from the set consisting of: DRAM controller, Ethernet controller, digital image sensor interface, hard disk controller, system expansion interface, and flash memory controller.

6. The apparatus of claim 1, wherein at least one of said programmable routing elements perform prioritized service and buffering of at least said first traffic stream.

7. The apparatus of claim 1, further comprising interface circuitry coupled between one of said segments and one of said system units.

8. The apparatus of claim 1, wherein at least one of the plurality of programmable routing elements accommodates concurrent transfer of multiple in put and/or output traffics.

9. An on-chip interconnection apparatus, comprising:
a plurality of programmable routing elements;
a plurality of communication segments coupled between said routing elements and a plurality of system units;
wherein a first traffic stream is transferred between two of said plurality of said system units through at least one of said plurality of programmable routing elements and at least one of said plurality of segments;
wherein a second traffic stream is transferred between two of said plurality of said system units through at least one of said plurality of programmable routing elements and at least one of said plurality of segments;
wherein said first traffic stream and said second traffic stream belong to distinct traffic classes; and
wherein said plurality of programmable routing elements implement a fabric schedule based on a global classification of said first traffic stream and said second traffic stream said fabric schedule being determined using optimization criterion based on two or more factors from a set consisting of bandwidth, quality of service, traffic priority class, cost, scalability for future enhancement, power consumption, physical size, development time, process technology, resource utilization and efficiency.

10. The apparatus of claim 9, wherein said global classification is based on one or more characteristics from the set consisting of: bandwidth
requirements, latency tolerance, real time deadline, burst behavior, internal unit utilization, and power consumption efficiency.

11. The apparatus of claim 9, wherein said fabric schedule is dynamically loaded based on traffic characteristics.

12. An on-chip interconnection apparatus comprising:
a plurality of routing elements;
a plurality of segments coupled between said routing elements and a plurality of system units;
a fabric scheduler coupled to said routing elements;
wherein the plurality of programmable routing elements and the plurality of communication segments are adapted for integration into very large scale integrated (VLSI) circuit designs;
wherein a first traffic stream is transferred between two of said plurality of said system units through at least one of said plurality of programmable routing elements and at least one of said plurality of segments;
wherein a second traffic stream is transferred between two of said plurality of said system units through at least one of said plurality of programmable routing elements and at least one of said plurality of segments; and
wherein said fabric scheduler implements a fabric schedule based on a global classification and a determined schedule said fabric schedule being determined using optimization criterion based on two or more factors from a set consisting of bandwidth, quality of service, traffic priority class, cost, scalability for future enhancement, power consumption, physical size, development time, process technology, resource utilization and efficiency.

13. The apparatus of claim 12, wherein said system units comprise one or more processing elements and one or more I/O device interface units.

14. The apparatus of claim 13, wherein said system units further comprise one or more shared resources.

15. The apparatus of claim 13, wherein said processing elements comprise one or more from the set consisting of: central processing units, encryption and decryption security processor, Fast Fourier Transform hardware accelerator, motion estimation hardware accelerator, Viterbi encoder and decoder, and other appropriate fixed function hardware accelerators.

16. The apparatus of claim 13, wherein said I/O device interface units comprise one or more from the set consisting of: DRAM controller, Ethernet controller, digital image sensor interface, hard disk controller, expansion interface, and flash memory controller.

17. The apparatus of claim 12, wherein at least one of said routing elements perform traffic format conversion on at least said first traffic stream.

18. The apparatus of claim 12, wherein at least one of said routing elements perform prioritization and buffering of at least said first traffic stream.

19. An on-chip interconnection apparatus comprising:
a plurality of routing elements;
a plurality of segments coupled between said routing elements and a plurality of system units;
a fabric scheduler coupled to said routing elements;
wherein a first traffic stream is transferred between two of said plurality of said system units through at least one of said plurality of programmable routing elements and at least one of said plurality of segments;
wherein a second traffic stream is transferred between two of said plurality of said system units through at least one of said plurality of programmable routing elements and at least one of said plurality of segments;
wherein said first traffic stream and said second traffic stream belong to distinct traffic classes; and
wherein said fabric scheduler implements a fabric schedule based on a global classification and a determined schedule said fabric schedule is determined using optimization criterion based on two or more factors from a set consisting of bandwidth, quality of service, traffic priority class, cost, scalability for future enhancement, power consumption, physical size, development time, process technology, resource utilization and efficiency.

20. The apparatus of claim 19, wherein said global classification is based on one or more characteristics from the set consisting of: bandwidth requirements, latency tolerance, real time deadline, power consumption, resource utilization, efficiency and burst behavior.

21. The apparatus of claim 19, wherein said fabric schedule is dynamically loaded based on traffic characteristics.

22. A method for using a fabric scheduler to couple a plurality of system units on a single chip, comprising the steps of:
   transferring a first traffic stream between two of said plurality of said system units through at least one of a plurality of programmable routing elements and at least one of a plurality of segments, wherein said plurality of segments are coupled between said routing elements and plurality of system units;
   transferring a second traffic stream between two of said plurality of said system units through at least one of said plurality of programmable routing elements and at least one of said plurality of segments; and
   using said fabric scheduler to implement a fabric schedule based on a global classification of said first traffic stream and said second traffic stream wherein said fabric schedule is determined using optimization criterion based on two or more factors from a set consisting of bandwidth, quality of service, traffic priority class, cost, scalability for future enhancement, power consumption, physical size, development time, process technology, resource utilization and efficiency.

23. The method of claim 22, wherein said system units comprise one or more processing elements and one or more I/O device interface units.

24. The method of claim 23, wherein said system units further comprise one or more shared resources.

25. The method of claim 24, wherein said I/O device interface units comprise one or more from the set consisting of: DRAM controller, Ethernet controller, digital image sensor interface, hard disk controller, expansion interface, and flash memory controller.

26. The method of claim 23, wherein said processing elements comprise one or more from the set consisting of: central processing units, encryption and decryption security processor, Fast Fourier Transform hardware accelerator, motion estimation hardware accelerator, Viterbi encoder and decoder, and other appropriate fixed function hardware accelerators.

27. The method of claim 22, further comprising the step of: traffic format conversion on at least said first traffic stream.

28. The method of claim 22, further comprising the step of: prioritized service and buffering of at least said first traffic stream.

29. A method for using a fabric scheduler to couple a plurality of system units on a single chip, comprising the steps of:
   transferring a first traffic stream between two of said plurality of said system units through at least one of a plurality of programmable routing elements and at least one of a plurality of segments, wherein said plurality of segments are coupled between said routing elements and plurality of system units;
   transferring a second traffic stream between two of said plurality of said system units through at least one of said plurality of programmable routing elements and at least one of said plurality of segments;
   wherein said first traffic stream and said second traffic stream belong to distinct traffic classes; and
   using said fabric scheduler to implement a fabric schedule based on a global classification of said first traffic stream and said second traffic stream wherein said fabric schedule is determined using optimization criterion based on two or more factors from a set consisting of bandwidth, quality of service, traffic priority class, cost, scalability for future enhancement, power consumption, physical size, development time, process technology, resource utilization and efficiency.

30. The method of claim 29, wherein said global classification is based on one or more characteristics from the set consisting of: bandwidth requirements, latency tolerance, real time deadline, burst behavior, resource utilization, efficiency, and power consumption.

31. The method of claim 29, wherein said fabric schedule is dynamically changed based on traffic characteristics.

* * * * *